INVENTOR.
WILLIAM J. ADAMS
EDWARD R. FRYER

Oct. 21, 1958   W. J. ADAMS ET AL   2,857,009
HYDRAULIC POWER UNIT FOR TRACTORS EQUIPPED WITH POWER
STEERING AND POWER OPERATED IMPLEMENTS
Filed Sept. 13, 1952   3 Sheets-Sheet 2

INVENTOR.
WILLIAM J. ADAMS
EDWARD R. FRYER
BY
Hyde, Meyer, Baldwin & Doran
ATTORNEYS Oct. 21, 1958   W. J. ADAMS ET AL   2,857,009
HYDRAULIC POWER UNIT FOR TRACTORS EQUIPPED WITH POWER
STEERING AND POWER OPERATED IMPLEMENTS
Filed Sept. 13, 1952   3 Sheets-Sheet 3
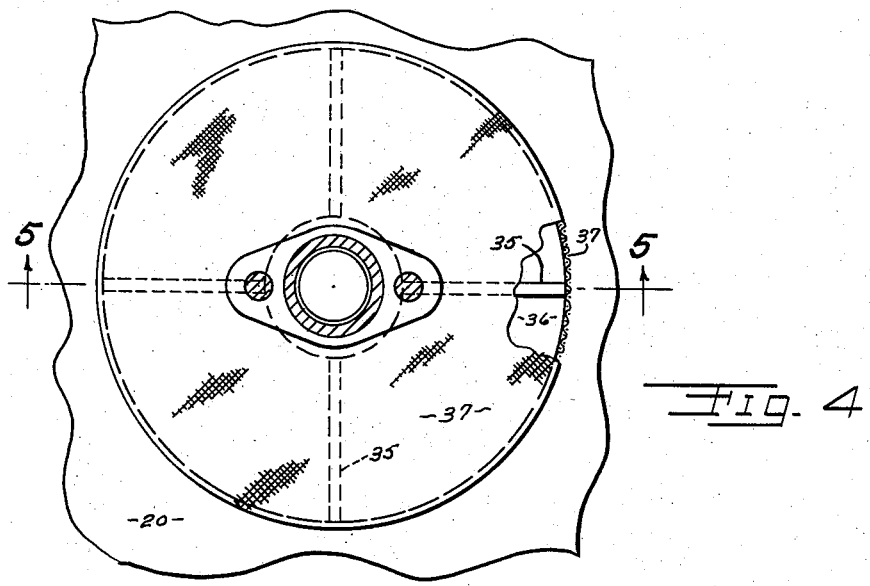
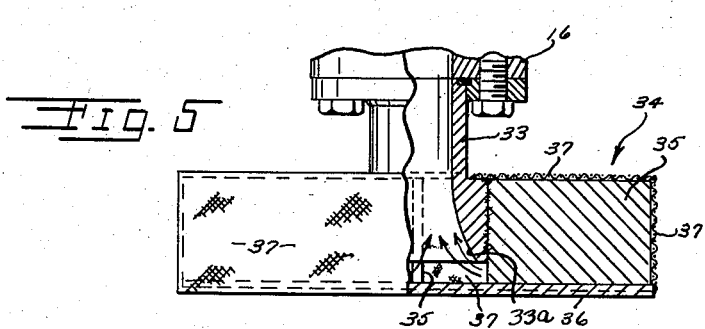
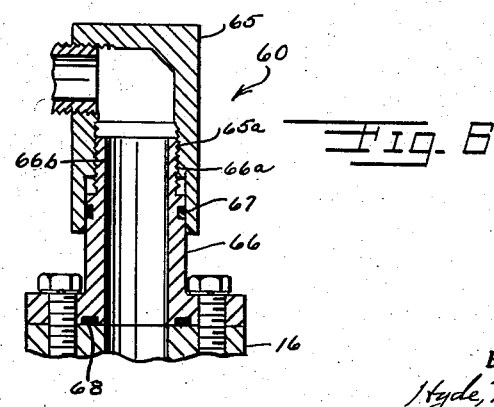
INVENTOR.
WILLIAM J. ADAMS
EDWARD R. FRYER
BY
Hyde, Meyer, Baldwin & Doran
ATTORNEYS

United States Patent Office 2,857,009
Patented Oct. 21, 1958

2,857,009

HYDRAULIC POWER UNIT FOR TRACTORS EQUIPPED WITH POWER STEERING AND POWER OPERATED IMPLEMENTS

William J. Adams, Santa Cruz, Calif., and Edward R. Fryer, Willoughby, Ohio, assignors, by mesne assignments, to General Motors Corporation, Detroit, Mich., a corporation of Delaware Application September 13, 1952, Serial No. 309,514

6 Claims. (Cl. 180—53)

This invention relates to improvements in a pressure fluid power unit and more particularly to a compact fluid power unit for fitting into a confined space.

One of the objects of the present invention is to provide a fluid power unit having a pump located in the fluid storage tank with the flow control valve for the pump secured to the outside of the tank.

Another object of the present invention is to provide a fluid power unit of the aforesaid type with the outer surface of the valve within the outer confines of the tank to form a compact structure.

Another object of the present invention is to provide a fluid power unit especially designed to fit in the confined space extending in a horizontal dimension between the front bumper and radiator of a vehicle and extending in a vertical dimension with its bottom high enough for sufficient ground clearance at all times under the vehicle and with its top not substantially blocking the flow of cooling air to the radiator and a fluid pump in said power unit conveniently located for driving by the engine of said vehicle.

Other features of this invention reside in the arrangement and design of the parts for carrying out their appropriate functions.

Other objects and advantages of this invention will be apparent from the accompanying drawings and description and the essential features will be set forth in the appended claims.

In the drawings,

Fig. 4 is an enlarged horizonal sectional view taken along the line 4—4 of Fig. 2 through the pump intake;

Fig. 5 is a side elevational view of the Fig. 4 intake partially in section along the line 5—5; while Fig. 6 is an enlarged vertical sectional view through the outlet or pressure side of the pump, taken along the line 6—6 of Fig. 1.

Those familiar with this art will recognize that the present invention in a hydraulic power unit may be applied in many ways, but it has been chosen to illustrate the same in connection with a tractor for pulling a digging and carrying scraper similar to the type shown in our copending U. S. patent application No. 287,772, entitled "Digging and Carrying Scraper," filed May 14, 1952 and since issued as Patent No. 2,773,320. The tractor in said copending application has a fluid power unit or pressure source for moving and for controlling the movement of the apron, bowl and ejector on the digging and carrying scraper by hydraulic pressure fluid supplied to single acting hydraulic hoists on each of said three mentioned scraper parts. The fluid in the above entitled application takes the form of oil under pressure but any other suitable fluid can be used.

Figure 1:
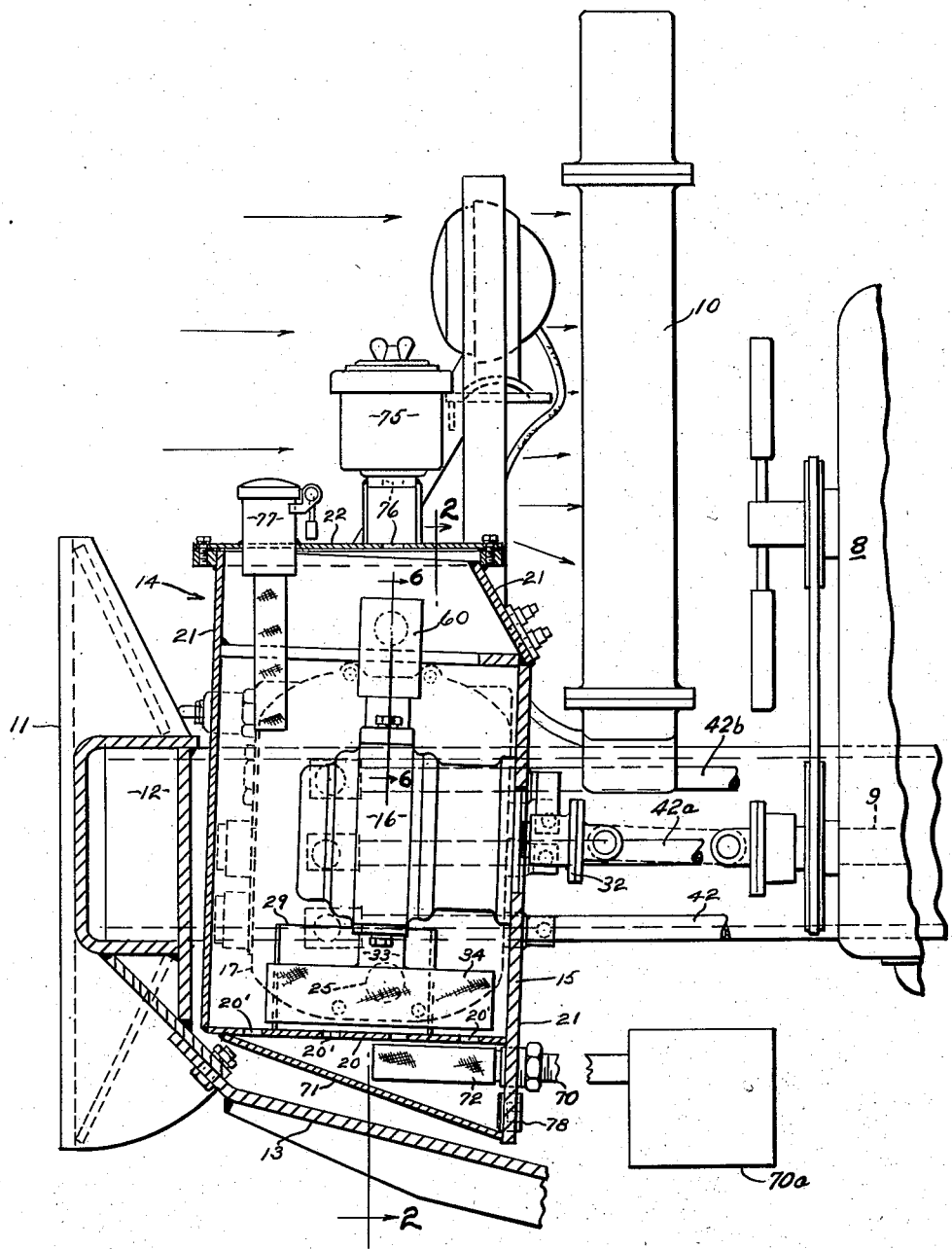
Fig. 1 is a vertical longitudinal sectional view through the fluid power unit located in the confined space on the front end of a vehicle.

The tractor in the present application has much of the conventional structure found on all tractors but Fig. 1 of the drawings illustrates only the front end of the tractor. An engine radiator is shown at 10 for an internal combustion engine 8 positioned to the right of Fig. 1 and having a crank shaft 9 with a longitudinal axis of rotation extending from front to rear of the engine and with its crank shaft axis extending under the radiator 10. A front bumper 11 is located in front of the radiator 10 by being secured to the front of parallel, spaced frame channels 12, 12 (Figs. 1 and 2) extending longitudinally along the length of the tractor. A pan guard 13 is secured at its forward end to the lower edge of the front bumper and extends rearwardly under the internal combustion engine for protection thereof. This is especially important in an off-the-highway type vehicle for protection from high centers and other irregular terrain.

Figure 2:
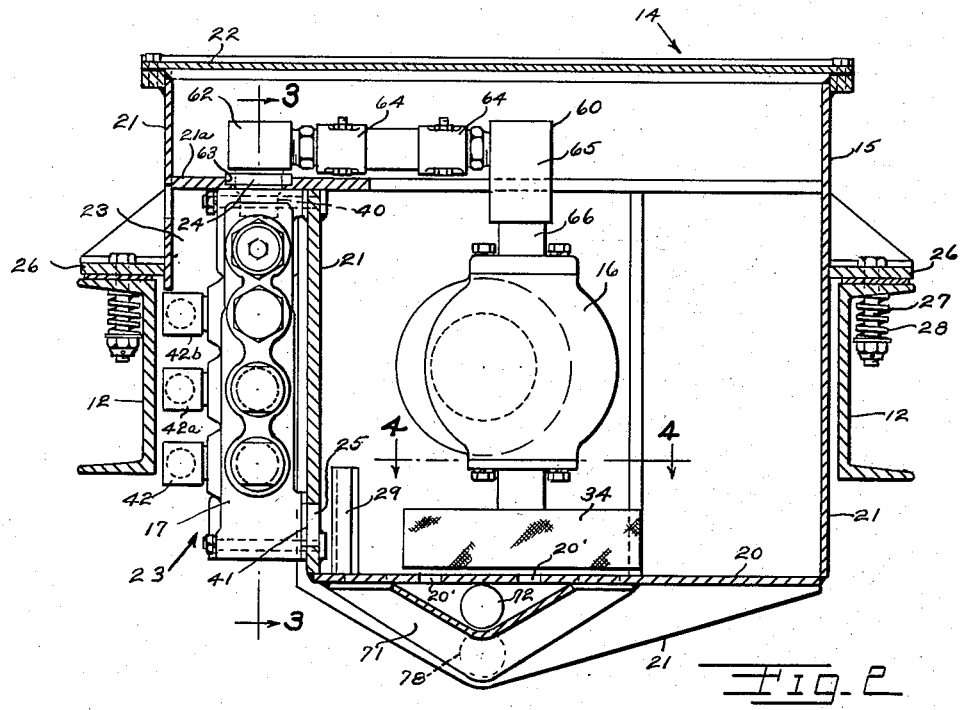
Fig. 2 is a vertical transverse sectional view taken along the line 2—2 through the fluid power unit.

The fluid power unit 14 in the present disclosure is especially constructed for location in the horizontally confined space between the front bumper 11 and the radiator 10 in Fig. 1 and between the spaced tractor frame channels 12, 12 in Fig. 2. The unit 14 is not high enough to interfere with the air flow to the radiator as shown by the arrows in Fig. 1 and is not low enough to be damaged by the irregular terrain found in off-the-highway operation. Pan guard 13 can also be used, if desired, to protect the bottom of the unit from damage. Also, the front bumper 11 protects the front of the unit from damage. The fluid power unit has a pressure pump driven by and connected to the internal combustion engine crank shaft under the engine radiator 10. In this location, the fluid power unit is not only effectively protected from damage but also compactly located in a space not normally utilized without interfering with the normal operation of the vehicle or tractor.

The fluid power unit, generally shown at 14, includes in general a fluid storage tank 15 having a pump 16 located therein with a control valve 17 (Fig. 2) secured directly to the outer surface of the tank in a depression therein with the outer surface of the valve lying within the outer confines of the tank. Then, the unit is completely self-contained for fitting within the confined space while the tank 15 has a maximum fluid volumetric capacity.

The fluid storage tank 15 is formed from plates welded or otherwise secured together. It includes a flat, horizontal bottom wall 20 surrounded by upwardly extending side walls 21 with a removable top cover 22 removably secured to the side walls by cap screws. A gasket is provided between the top cover 22 and the side walls to prevent leakage. When the cover 22 is removed, the pump 16 and the other components within the tank 15 are completely accessible.

The fluid storage tank 15 has a depression 23 in its outer wall formed by the tank side walls, as shown in Fig. 2, in which valve 17 is located.

The pressure fluid outlet port 24 is formed in a horizontal portion 21a of the tank side wall forming the depression. Pressure fluid is pumped from the tank through this port to the control valve 17 for distribution to the proper single acting hydraulic cylinder on the scraper. A fluid inlet or return port 25 is provided in the side wall 21 of the tank extending perpendicular to horizontal portion 21a and is located above the flat horizontal bottom wall 20 for returning the fluid from the single acting hoists and the control valve 17 back into the storage tank 15. A baffle 29 is welded or otherwise secured to the bottom wall 20 in the path of the returning fluid flow so that it is directed in a circular motion around the walls of the tank. This construction prevents re-circulation of the same fluid immediately so that all the fluid in the tank is thoroughly mixed and kept cool.

The fluid storage tank 15 is mounted between the parallel, spaced tractor frame channels 12, 12 in Fig. 2. Supporting lugs 26, 26 are welded or otherwise secured to the opposite side walls 21, 21 of the tank 15. Each lug has a hole aligned with a corresponding hole in the top flange of its associated frame channel. Each pair of aligned holes has a bolt and nut assembly 27 extending therethrough with a spring 28 secured between the nut and the upper flange of the tractor frame for suspending the fluid power unit 14 in its proper position.

The pump 16 is located above the bottom of and approximately in the middle of the tank 15. This location is determined by the relative dimensions of the tractor and the confined space within which the fluid power unit 14 is located. In locating the tank 15 in front of the radiator 10 of the tractor, it is necessary to keep the height of the tank down so that it does not obstruct materially the flow of the air into the radiator 10 shown by the arrows in Fig. 1. To get the capacity necessary in the tank, it is necessary to make the tank 15 rather deep and consequently a considerable part of the tank is between the pump and the bottom of the tank. It is not desirable to make the tank 15 larger in a fore-and-aft distance as it would make it necessary to lengthen the tractor frame channels 12, 12 and to extend the bumper 11 forwardly. This would increase the weight on the tractor front wheels while it is more desirable to have the maximum weight on the tractor rear wheels to get maximum driving traction. In view of the above mentioned design problems, the required oil capacity in the tank 15 can only be obtained by extending the tank downwardly and by locating the pump 16 approximately in the middle of the tank.

The pump 16 bolts to the tank side wall 15 on the right in Fig. 1 to seal the opening in the side wall through which the pump drive shaft extends. The usual pump seal is used around the driving shaft to prevent oil from leaking at this point. The pump drive shaft is coupled to and driven by the engine crank shaft 9 by coupling 32. The coupling may be of any desired form for allowing for misalignment such as the conventional type, including universal joints, etc. In a preferred construction form, the pump drive shaft and engine crank shaft can be approximately coaxially aligned with no gear box or auxiliary drive transmission therebetween.

The conventional tractor structural features and the fluid power unit 14 are structurally designed to cooperate with each other. As brought forth heretofore the pump location is fixed by the location of the engine crank shaft 9. Correspondingly, the location of radiator 10 is fixed inasmuch as it is necessary to keep it as low as possible without interfering with the pump drive shaft connection to the crank shaft thereunder. These factors, in addition to those mentioned in previous paragraphs, make it necessary that pump 16 be located in the center of the tank 15 with the additional tank storage capacity being located below the pump.

The pump 16 has an inlet in fluid communication with the fluid in the tank immediately above the horizontally extending bottom 20. This takes the form in the present disclosure of a suction intake line in Figs. 4 and 5 rigidly connected to the pump extending downwardly toward the bottom of the tank with its intake portion immediately above the bottom wall 20. This suction intake line includes an intake conduit 33 in Fig. 5 having its upper end bolted onto the intake side of the pump 16 by cap screws with an O-ring therebetween for preventing leakage and having its lower end forming inlet 33a of pump 16. An intake screen 34 is mounted directly on the bottom or inlet of the conduit 33 and includes a plurality of webs 35, four in number, welded to the intake conduit 33 at their inner end and extending radially in spoke fashion therefrom. A plate 36 is secured to the lower surface of each web and spaced below conduit 33, while a fine wire mesh filter screen 37 surrounds the radially outer and top surfaces of the web frame work between the intake conduit 33 and the bottom plate 36. All of the parts of the intake screen 34—the webs 35, the bottom plate 36 and the screen filter material 37—are welded or brazed to each other which in turn is welded or brazed to the intake conduit 33.

When the pump is in operation, the fluid flows into the bell-mouthed inlet at the bottom of the intake conduit, as shown by the arrows in Fig. 5. Hence, the pump 16, even though located in approximately the center of the tank 15, can raise the fluid from the bottom wall thereof.

The intake screen 34 with its interior framework acts as a support or pedestal when an assembler or repairman is handling the pump. The pump 16 is heavy for convenience when assembling or repairing the unit so the entire assembly can be set into the tank 15 with the intake screen 34 resting on the flat, approximately horizontal bottom 20 of the tank. When the pump 16 is to be bolted in place on the side wall 15 on the right hand side of Fig. 1, the pump assembly may be lifted off of the bottom 20 to leave clearance between the bottom of the intake screen 34 and the bottom of the tank at 20, if this clearance is desired. Of course, intake screen 34 need not have its bottom positioned above bottom 20 since fluid flows in through screen 37 on the sides and top but this clearance on the bottom allows for variations in manufacturing dimensions.

Figure 3:
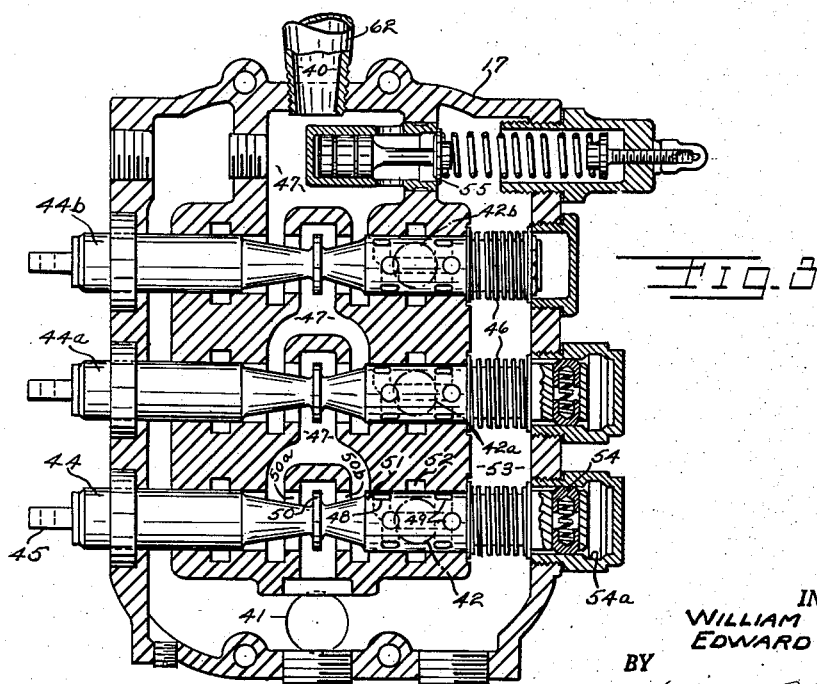
Fig. 3 is an enlarged vertical sectional view taken through the control valve along the line 3—3 of Fig. 2.

The control valve 17 in Fig. 2 is secured directly to the tank 15 in the depression 23 so that the outer surface of the valve lies within the outer confines of the tank and the tank has a maximum fluid capacity. This valve, being located on the outside of the tank is easy to service under all conditions. The valve in Fig. 3 has a manifold with a plurality of ports therein, including a fluid pressure valve inlet port 40 in its upper wall secured in fluid communication with the high pressure outlet side of the pump and aligned with the outlet port 24 in the storage tank 15. A fluid return or valve outlet port 41 is aligned with the inlet or return port 25 in the tank so that the control valve can be rigidly mounted within the depression 23 and the tank wall. It should be noted that each port, 40 and 41, is located on a different side of the control valve housing 17 to cooperate respectively with the approximately right angularly disposed inner walls 21a and 21 of the depression 23.

The control valve 17 has three ports and associated fluid conduits, as shown at 42, 42a and 42b, with each conduit in fluid communication with one of the fluid pressure operated single acting hoists for raising and lowering individually the scraper apron, bowl or ejector in response to movement of the control valve 17, as will be brought out more in detail hereinafter. The control valve 17 has three valve stems 44, 44a and 44b corresponding in number to these three conduits with one valve stem controlling the flow to and from each conduit. Since each valve stem and the structure associated therewith is substantially identical, the operation of only one will be described. The valve stem 44 is connected to an actuating arm on the tractor having one end secured through the aperture 45 at the left end of stem 44 and having the other end conveniently located near the tractor operator. The valve stem 45 is normally held in the position shown in Fig. 3 but is axially slidable either to the right or to the left of this position against the bias of spring 46 tending to return it to its normal position by urging against one or the other of the washers located at the opposite end of the spring and carried by the valve stem. Spaced ports 48 and 49 are drilled into the outside surface of the valve stem and are connected by a through hole in the center of the stem. As the valve stem 44 is moved to the left against the bias of spring 46, the fluid flowing in through the high pressure inlet 40, flows through the passageway 47, through the connected ports 48 and 49 to a recess 52 in fluid communication with the conduit 42 to the single acting hydraulic hoist on the scraper connected therewith. The shoulder 50 (closing port 50a) and the cylindrical diameter 51 on the valve stem (closing port 50b) prevent the through flow of the fluid from the high pressure inlet 40 to the return port 41 on the low pressure side of the valve. When the three valve stems 44, 44a, and 44b are all in their normal position shown in Fig. 3, the fluid from the pump circulates through the valve (through inlet 40, passageway 47 and outlet 41) back into tank 15.

When the tractor operator desires to drain the oil or other fluid from the single acting hoist on the scraper, he moves the valve stem 44 to the right to align ports 48 with recess 52 and ports 49 with a passageway 53 in fluid communication with the low pressure return port 41. Hence, the fluid can easily drain out of the proper single acting hoist back into the tank 15. A spring loaded ball and detent 54, engaging in groove 54a, may be used to hold the valve stem 44 in the last mentioned position against the bias of spring 46, if desired.

A safety relief valve 55 is provided between the high pressure side and the low pressure return side of the valve for safety purposes.

It should be noted that some of the ports 48 and 49 are axially displaced with respect to the other ports so that the single acting hydraulic hoist controlled by the valve stem can be "inched" along by closely controlling oil flow.

A conduit 60 is provided between the high pressure outlet side of the pump 16 and the inlet port 40 of control valve 17 with this conduit extending through the outlet port 24 in the fluid storage tank 15.

It is desirable to have some flexibility in this high pressure conduit 60 to allow for variations in distance, both vertically and horizontally, between the outlet high pressure side of pump 16 and the inlet port 40 of control valve 17. The inlet port of the control valve 17 and the high pressure outlet side of the pump 16 have fixed locations which cannot be varied after the valve and pump are mounted on the tank. These locations are determined by the size and relative dimensions of the storage tank 15.

At the same time, since pump 16 is located within the storage tank 15 and while control valve 17 is located outside of the storage tank, it is also necessary to allow for movement between the high pressure conduit 60 and the storage tank 15 by providing a flexible seal therebetween. Its flexibility must be large enough to take care of variations in dimensions of the different component parts of the unit 14 as well as movement between pump 16, valve 17 and tank 15 while not permitting leakage of the fluid from the storage tank 15. Of course, a high pressure seal generally lacks flexibility since it must have a high resistance to leakage and therefore, a low pressure seal is more desirable. That reasoning explains the present construction. A one-piece street ell 62 forms part of a conduit for high pressure fluid extending from within the storage tank 15 having fluid under low or no pressure through the tank outlet port 24 into the inlet port 40 of valve 17 having fluid under high pressure. A low pressure seal 63, taking the form of the present disclosure of an O-ring gasket, is recessed into the tank wall 21a to seal the port 24 around the street ell 62 for preventing low pressure fluid leakage out of the storage tank 15 while allowing sufficient flexibility to take care of variations in dimensions as well as movements between the component parts. The low pressure oil seal 63 effectively prevents leakage from the low pressure fluid in storage within the tank 15. If any leaks occur in the high pressure conduit 60 between the outlet of pump 16 and street ell 62, the fluid will flow directly into the storage tank 15 but will not leak outside thereof.

A hose connection 64 with clamp type couplings at opposite ends is used in this high pressure conduit 60 to take care of variations in horizontal alignment and dimensions and to absorb vibrations.

Of course, the clamps of the hose assembly can be adjusted to compensate for variations in horizontal alignment but the variations in vertical alignment must be compensated for by the telescopic connection described hereinafter. As shown in Fig. 6, an elbow 65 is secured to the inlet end of the hose assembly and is threadably connected to a flange fitting 66 by mating thread 65a, 66a on the respective parts. An O-ring 67 carried on the periphery of an upwardly extending cylindrical tubular portion on fitting 66 telescopes in a mating cylindrical bore on elbow 65. The flanged lower end of fitting 66 is secured to the outlet side of pump 16 with an O-ring 68 preventing leakage from the flanged joint; fitting 66, being rigidly secured to pump 16, forms pump outlet 66b. It should be apparent that after the street ell 62 has been connected in the valve inlet port 40 and pump 16 has been secured to the tank side wall 21 with the high pressure conduit 60 completely assembled except for the connection of the flanged fitting 66 to the outlet side of pump 16, then flanged fitting 66 can be rotated so that the threaded connection 65a, 66a elevates or lowers the flanged lower end of fitting 66 until it is properly aligned with the outlet side of the pump 16. Of course, O-ring 67 prevents any leakage in the telescopic joint when the fluid power unit is being operated.

The construction described heretofore is satisfactory when pressure fluid is supplied only to the control valve 17 for actuating the different components of a scraper pulled by the tractor. However, large off-the-highway tractors frequently have hydraulic booster steering for aiding in steering the large, cumbersome equipment. It is advantageous to use a common fluid reservoir for both the booster steering system and the scraper-component-actuating single acting hydraulic hoist. However, if a common reservoir is used, it is desirable that the booster steering system have first call on the fluid in the reservoir if fluid is low in the reservoir because of a leak in the system or for other causes and there is not enough for both the booster steering system and the scraper hoist. An inoperative steering system might imperil human life while an inoperative hoist would probably only cause a delay in work. A suction line 70, located at the bottom of tank 15 in Fig. 1, leads to a pump driven fluid actuated booster steering device 70a for the tractor with the fluid first flowing to a pump (not shown) in the device and then driven by the pump into a fluid actuated motor (not shown) in said device for providing the hydraulic booster steering action in the conventional manner. The sloping, trough-shaped bottom 71 is welded or otherwise secured to the storage tank 15 below the flat, horizontally extending bottom 20 with the suction line 70 connected to the one of the tank side walls 21 between the bottoms. The horizontally extending bottom 20 has perforations above the sloping bottom 71 so that the fluid in the upper, large storage volume can flow down between the bottoms 20 and 71 for supplying the hydraulic booster steering system.

A screen 72 fits over the inlet of suction line 70 to assure that the oil or other hydraulic fluid flowing to the hydraulic booster steering system is clean. This screen 72 is especially necessary since the hydraulic booster steering system gets its hydraulic fluid from the bottom of the storage tank where sediment and other foreign matter will probably collect. It should be apparent that with this construction, the hydraulic booster steering system has first call on the fluid in the tank 15 if there is not enough for both the hydraulic booster steering system and the hydraulically operated hoists on the scraper.

The fluid power unit 14 has other attachments associated therewith for assuring satisfactory operation. An air cleaner 75 is used as a breather vent since single acting hoists are used. This air cleaner is mounted at a high center point to avoid oil discharging through it and restrictions 76 are provided in the standpipe leading to the air cleaner 75 to prevent the hydraulic fluid rushing upwardly from the tank 15 into the air cleaner 75. A filler neck 77 is provided in the top cover 22 through which hydraulic fluid may be introduced into the tank 15. This filler neck 77 is equipped with a screen for filtering the oil when it is poured into the tank. The cap shown on the top of the filler neck is provided with a fitting so that it can be locked in its closed position. A drain plug 78 is provided at the extreme lower right hand side of the tank 15 in Fig. 1 opposite the sloping bottom 71 of the tank and located at the extreme low point of the tank in the wall of the drain sump. This drain plug 78 can be easily unscrewed so that the tank 15 will clear itself of chips and other foreign matter when it is drained.

In summary, it may be said that the fluid power unit 14 forms an extremely compact unit especially designed for mounting in the confined space extending horizontally between the engine radiator 10 and the front bumper 11 in the fore and aft or longitudinally extending dimension in Fig. 1, and between the spaced tractor frame channels 12, 12 in Fig. 2. The top of the unit is located low enough so that it does not interfere with the normal air flow to the radiator 10 shown by the arrows in Fig. 1 and the bottom is sufficiently high so that it is located above the pan guard 13 for sufficient ground clearance even though the tractor may be going over rough terrain in off-the-highway operation. The pump 16 is located in approximately the center of the tank 15 so that it may be connected directly to the crank shaft of the tractor motor while tank 15 has maximum fluid capacity. Also, the unit utilizes space rarely used on a tractor or other vehicle while not only causing no interference with the normal operation of the vehicle but being surrounded on all sides except the top by vehicle structure to prevent damage to the unit. The removable cover and unobstructed top of the unit are provided for giving ready access to the pump and other component parts found within the storage tank.

Another advantage of the present invention is that it completely eliminates any possibility of suction air leaks into the inlet of the pump. The pump is submerged in the liquid in the tank and the inlet is in the tank also and thus there is no possibility of any air leaking into the pump.

A further advantage of this invention is that it provides a very short and direct and substantially unrestricted repeated cycle of flow of liquid through the pump and valve and tank back to the pump during such period when the control valves are not being used to operate the pressure fluid connected equipment. This involves approximately 75 to 95% of the total operating time of the type of device here disclosed. Prior systems of this type have had long and costly and troublesome high pressure and suction lines with numerous fittings and sharp corners so that during the idle periods of the equipment, the repeated cycle of flow of the hydraulic fluid was necessarily at higher pressures and tended to build up hydraulic heat caused by the continuous circulation of the fluid through the long and restricted system. This invention provides an extremely short and efficient cycle for the flow of the hydraulic oil during the inoperative periods of the equipment. This flow is from the tank 15 and pump screen 37, through the pump 16 and the short connection 60 between the pump and control valve 17, then through the valve 17 and port 25 directly into the tank 15 again. Referring to Fig. 2, it will be seen that this is a very short cycle of flow and does not heat up the hydraulic fluid.

Another valuable feature of this invention is clearly seen in Fig. 1 where the perforate bottom 20 having spaced perforations 20' is spaced above the lower bottom 71 which in turn is inclined to a single point where we provide the drain plug 78. Those familiar with this type of equipment will realize that it is very necessary to keep the oil clean so as to reduce the wear on the equipment operated by the hydraulic fluid and all other parts which handle the hydraulic fluid. Most systems provide costly screens and filtering devices which seldom get the care and the constant cleaning and flushing which they should have. The arrangement here shown of the double bottom provides a definite pocket for the collection of dirt, chips and other foreign matter which is always found in the hydraulic system of equipment of this sort. The holes 20' in the top plate 20 provide for the settlings and dirt to be washed through by the circulation of the oil in the tank 15 so that they drop through to the quieter pool or pocket below the plate 20 and above the plate 71. The perforations 20' in the perforate bottom 20 are sufficient to permit the dirt and chips to pass through but insufficient to permit substantial agitation of the liquid between the bottom 20 and the bottom 71 by the circulation of the fluid which constantly takes place in the tank 15 above the bottom 20. On the other hand, there is sufficient jolting and agitation of the liquid between the bottoms 20 and 71 to cause the dirty material in the lower pocket to slide down the sloping bottom 71 to the lowest point, so that when the drain plug 78 is removed all of this material is washed out.

A further advantage from the placing of this hydraulic power unit at the front of the tractor between the bumper and radiator is the placing of the weight of the tank, the hydraulic fluid contained therein and the related equipment such as the pump, control valve, and etc., near the front of the tractor where it offsets the tendency of the tractor to rear up. It is well known that in this type of equipment, when making heavy pulls, the front end of the tractor tends to rise up and in some cases additional dead weight is placed on the front of the tractor to prevent this. The mounting of our hydraulic power unit in the location shown in Fig. 1 has the advantage of providing this weight while at the same time performing a necessary function.

Various changes in details and arrangement of parts can be made by one skilled in the art without departing from the spirit of this invention or the scope of the appended claims.

What we claim is:

1. A compact fluid power unit, comprising a fluid storage tank, a pump inside said tank with an inlet and a high pressure outlet, said pump having its inlet in fluid communication with the fluid in said tank, a valve secured directly to the outer surface of the tank and located outside the tank and having a pressure fluid inlet port in fluid communication with the high pressure side of said pump and a fluid return port with each valve port on different sides of said valve, said valve having at least one third port for fluid connection with a fluid pressure operated device controlled by said valve, said tank having a depression in its outer wall with ports in the tank wall on different sides of said depression in close proximity with, aligned with and in fluid communication with the inlet and return ports of said valve, said valve lying within a space bounded by projections of the outer surfaces of said tank adjacent said depression, whereby said tank and valve occupy a relatively small volume in comparison with the tank capacity.

2. In a vehicle having an internal combustion engine, a crank shaft in said engine having a longitudinal axis of rotation extending from front to rear of said engine, a radiator for said engine positioned in front of said engine but above the axis of said crank shaft, a front bumper in front of said radiator, a pump driven fluid actuated booster steering device for said vehicle, and means actuated by fluid pressure and associated with said vehicle; the combination of a fluid power unit for said means located in the confined space extending in a horizontal dimension between said front bumper and radiator and extending in a vertical dimension with its bottom slightly above the minimum ground clearance of the vehicle but with its top at a position allowing sufficient flow of cooling air to said radiator, said fluid power unit including a tank for storing the fluid and a fluid supply pump for supplying actuating fluid to said means and located above the bottom of said tank, said pump being located in said tank and having a drive shaft approximately coaxial with and driven by said crank shaft, said pump having a suction intake line rigidly connected thereto and extending downwardly toward the bottom of the tank with its intake end normally submerged in the fluid in said tank, whereby said tank has a large fluid capacity in view of said confined space, said tank having a perforated flat upper bottom, said tank also having a sloping lower bottom below said flat upper bottom and with a fluid flow inlet to the pump of said booster steering device between said bottoms and below the intake end of said fluid supply pump, whereby said booster steering device will have first call on the fluid in said tank if there is not enough fluid for both said booster steering device and said means.

3. In a vehicle having an internal combustion engine, a crank shaft in said engine having a longitudinal axis of rotation extending from front to rear of said engine, a radiator for said engine positioned in front of said engine but above the axis of said crank shaft, a front bumper in front of said radiator, a pump driven fluid actuated booster steering device for said vehicle, and means actuated by fluid pressure and associated with said vehicle; the combination of a fluid power unit for said means located in the confined space extending in a horizontal dimension between said front bumper and radiator and extending in a vertical dimension with its bottom slightly above the minimum ground clearance of the vehicle but with its top at a position allowing sufficient flow of cooling air to said radiator, said fluid power unit including a tank for storing the fluid and a fluid supply pump for supplying actuating fluid to said means, said pump being located in said tank and being driven by said crank shaft, said tank having a perforated flat upper bottom, said tank having a sloping lower bottom below said flat upper bottom and with an outlet to the pump of said booster steering device, whereby said booster steering device will have first call on the fluid in said tank if there is not enough fluid for both said booster steering device and said means, said fluid supply pump having an inlet and a high pressure outlet for delivering said fluid at high pressure, said fluid supply pump having its inlet in fluid communication with the fluid in said tank, a valve with a valve manifold secured directly to the outer surface of the tank and having a pressure inlet port associated with a corresponding port on said tank, a fluid conduit connected to the high pressure outlet of said fluid supply pump through said tank port and connected to the pressure inlet port of said valve, said conduit including a one-piece conduit portion extending from said valve pressure inlet port through said tank port into said tank, a low pressure seal at said tank port between the tank wall and said one-piece conduit portion having sufficient flexibility to take care of variations in mounting dimensions and variations caused by movement between the valve and tank, and a return port in said valve manifold associated with a corresponding port on said tank above said flat bottom for return fluid flow into said tank.

4. A power unit for a steerable vehicle, comprising a tank for storing a fluid, a fluid supply pump located above the bottom of said tank for supplying fluid from said tank to a fluid pressure actuated device, a pump driven fluid actuated booster steering device for said vehicle, said fluid supply pump being located in said tank and having a suction intake line rigidly connected thereto and extending downwardly toward the bottom of the tank with its intake end normally submerged in the fluid in said tank, whereby said tank has a large fluid capacity, said tank having a perforated flat upper bottom, said tank also having a sloping lower bottom below said flat upper bottom and with a fluid flow inlet to the pump of said booster steering device between said bottoms and below the intake end of said fluid supply pump, whereby said booster steering device will have first call on the fluid in said tank if there is not enough fluid for both said booster steering device and said fluid pressure actuated device.

5. A compact pressure fluid supply unit comprising a fluid storage tank, a pump inside said tank with said pump having an inlet in said tank and an outlet respectively at the bottom and top thereof, a valve located outside said tank and secured to and immediately adjacent an outer wall of said tank, said valve having an inlet port and outlet ports, said outlet ports including at least one outlet port for fluid connection with a pressure fluid operated device controlled by said valve and another outlet port being a fluid return port opening directly into said tank, said valve inlet and fluid return ports being located respectively at the top and bottom thereof and approximately at the same horizontal levels respectively as said pump outlet and inlet, a short direct conduit connection between said pump outlet and said valve inlet port, and said valve having an operative position where it connects said valve inlet port with said one valve outlet port and having an inoperative position where it connects said valve inlet port and said valve fluid return port, whereby, when said valve is in inoperative position, a short direct repeated cycle of flow is provided for the fluid through said pump and valve and tank back to the pump.

6. In a hydraulic pressure fluid supply system, a tank, a pump having an inlet normally in fluid communication with the fluid in said tank to receive fluid therefrom and having an outlet with a connection for returning fluid to said tank, said tank having a perforate bottom below said connection for returning fluid to said tank, said tank having an imperforate bottom below said perforate bottom, said imperforate bottom sloping to a low point to form a fluid chamber with and below said perforate bottom, a drain plug at said low point for draining fluid from said chamber and tank, said perforate bottom extending across the fluid flow path from said connection to said chamber, said perforate bottom having perforations permitting fluid with dirt and chips to pass downwardly therethrough into said chamber while preventing substantial agitation of the fluid in said chamber by fluid returning through said connection above said perforate bottom to said tank.

References Cited in the file of this patent

UNITED STATES PATENTS

| | | |
|---|---|---|
| 479,299 | Neumann | July 19, 1892 |
| 1,200,337 | Fraser | Oct. 3, 1916 |
| 1,716,105 | Brandt | June 4, 1929 |
| 1,820,855 | Whitehead | Aug. 25, 1931 |
| 1,913,128 | Peter | June 6, 1933 |
| 2,032,886 | Murphy et al. | Mar. 3, 1936 |
| 2,325,729 | Allin | Aug. 3, 1943 |
| 2,352,958 | Lauer et al. | July 4, 1944 |
| 2,382,437 | Molly | Aug. 14, 1945 |
| 2,402,449 | Rockwell | June 18, 1946 |
| 2,403,325 | Armington | July 2, 1946 |
| 2,416,801 | Robinson | Mar. 4, 1947 |
| 2,433,918 | Mefferd | Jan. 6, 1948 |
| 2,509,577 | Phillips | May 30, 1950 |
| 2,521,652 | Rockwell | Sept. 5, 1950 |
| 2,530,357 | Kateley | Nov. 14, 1950 |
| 2,531,794 | Walmsley | Nov. 28, 1950 |